(12) United States Patent
Ruehle

(10) Patent No.: US 9,064,032 B2
(45) Date of Patent: Jun. 23, 2015

(54) BLENDED MATCH MODE DFA SCANNING

(71) Applicant: Intel Corporation, Santa Clara, CA (US)

(72) Inventor: Michael Ruehle, Albuquerque, NM (US)

(73) Assignee: Intel Corporation, Santa Clara, CA (US)

( * ) Notice: Subject to any disclaimer, the term of this patent is extended or adjusted under 35 U.S.C. 154(b) by 162 days.

(21) Appl. No.: 13/646,315

(22) Filed: Oct. 5, 2012

(65) Prior Publication Data

US 2014/0101176 A1    Apr. 10, 2014

(51) Int. Cl.
*G06F 17/30*    (2006.01)

(52) U.S. Cl.
CPC .................. *G06F 17/30985* (2013.01)

(58) Field of Classification Search
USPC .......................................................... 707/758
See application file for complete search history.

(56) References Cited

U.S. PATENT DOCUMENTS

| 7,899,904 | B2 * | 3/2011 | Ruehle | 709/224 |
| 7,949,683 | B2 * | 5/2011 | Goyal | 707/798 |
| 8,180,803 | B2 * | 5/2012 | Goyal | 707/798 |
| 8,386,411 | B2 * | 2/2013 | Atasu et al. | 706/48 |
| 8,688,608 | B2 * | 4/2014 | Atasu et al. | 706/45 |

* cited by examiner

*Primary Examiner* — Debbie Le
(74) *Attorney, Agent, or Firm* — Douglas A. Dallmann

(57) ABSTRACT

Disclosed is a method for simultaneously finding matches for rules that require greedy matching and comprehensive matching by executing a single Deterministic Finite Automaton (DFA). DFAs annotations are used to enable a single DFA to represent rules that require greedy and comprehensive matching. DFA descents are performed from various positions in an input stream, match information is recorded and match results are selectively generated (filtered) to achieve the greedy or comprehensive match behavior required by individual rules.

8 Claims, 3 Drawing Sheets

BLENDED MATCH MODE DFA SCANNING

BACKGROUND

With the maturation of computer and networking technology, the volume and types of data transmitted on the various networks have grown considerably. For example, symbols in various formats may be used to represent data. These symbols may be in textual forms, such as ASCII, EBCDIC, 8-bit character sets or Unicode multi-byte characters, for example. Data may also be stored and transmitted in specialized binary formats representing executable code, sound, images, and video, for example.

Along with the growth in the volume and types of data used in network communications, a need to process, understand, and transform the data has also increased. For example, the World Wide Web and the Internet comprise thousands of gateways, routers, switches, bridges and hubs that interconnect millions of computers. Information is exchanged using numerous high level protocols like SMTP, MIME, HTTP and FTP on top of low level protocols like TCP, IP or MAP. Further, instructions in other languages may be included with these standards, such as Java and Visual Basic.

As information is transported across a network, there are numerous instances when information may be interpreted to make routing decisions. In an attempt to reduce the complexity associated with routing decisions, it is common for protocols to be organized in a manner resulting in protocol specific headers and unrestricted payloads. Subdivision of the packet information into packets and providing each packet with a header is also common at the lowest level, for example TCP/IP. This enables the routing information to be at a fixed location thus making it easy for routing hardware to find and interpret the information.

SUMMARY

In an embodiment of the invention, disclosed is a method for matching rules to an input stream by executing a single DFA having a plurality of states, wherein the rules require greedy matching and comprehensive matching, comprising executing the DFA in a single scan descent, reporting comprehensive match tokens, and reporting greedy match tokens.

In an embodiment of the invention, disclosed is a method for matching rules to an input stream by executing a single DFA in a single descent having a plurality of states, wherein the rules require greedy matching and comprehensive matching, comprising accessing an instruction which comprises a base address of a state block to be accessed next, if a greedy match flag is set, updating greedy last accept information based on said base address, and if a comprehensive match flag is set, accessing at least one instruction at an offset from the base address.

In an embodiment of the invention, disclosed is a system of matching both greedy matches and comprehensive matches in a single execution of a DFA, comprising a ruleset used to match symbols in an input stream wherein said ruleset has annotations for at least one greedy and one comprehensive match and wherein a comprehensive match provides a match token output and a greedy match provides an update to a greedy last accept.

DETAILED DESCRIPTION OF THE EMBODIMENTS

Figure 1:
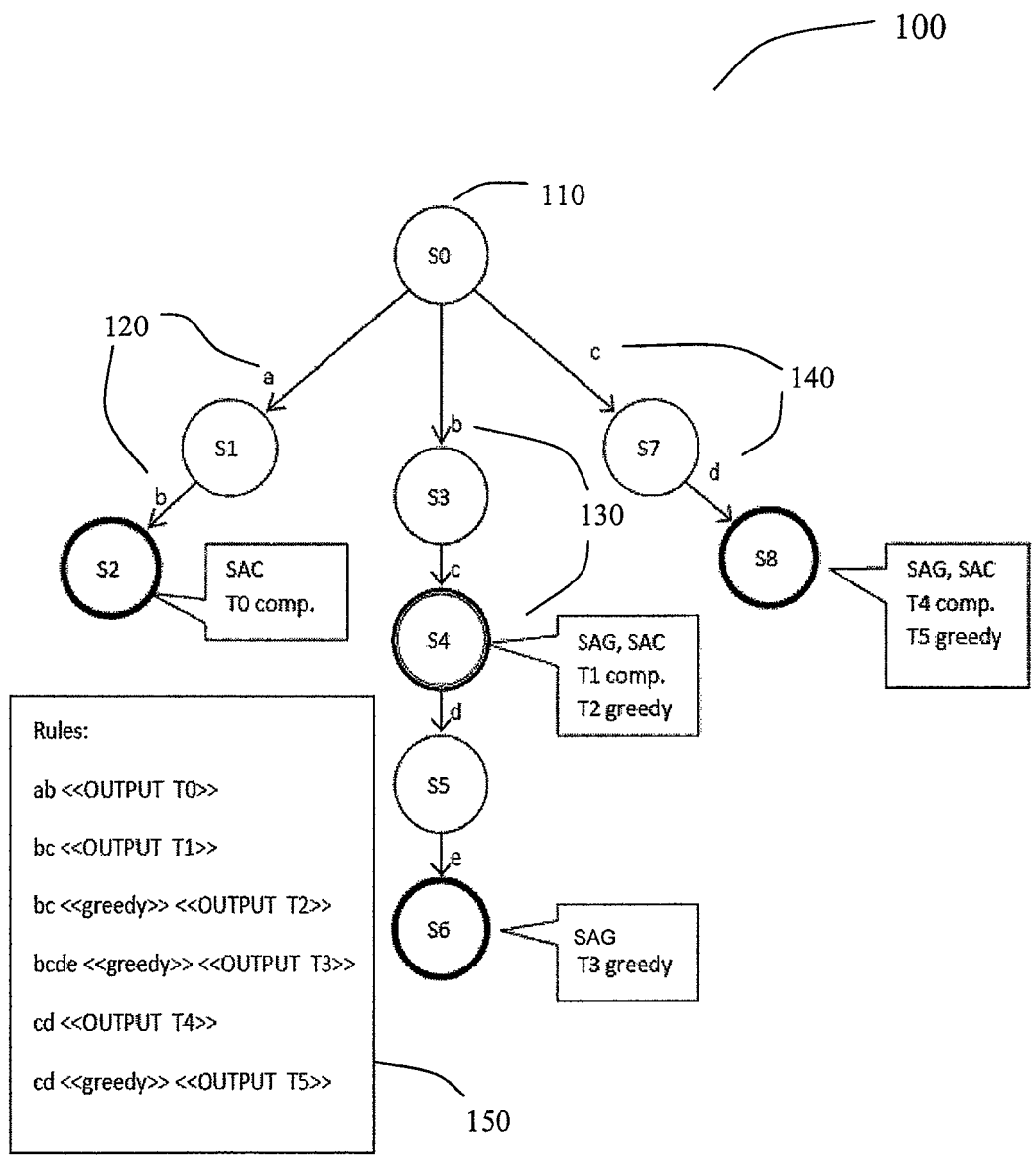
FIG. 1 shows a state machine for a Blended Match Mode.

With the increasing nature of the transmission of information, there is an increasing need to be able to identify the contents and nature of the information as it travels across servers and networks. Once information arrives at a server, having gone through all of the routing, processing and filtering along the way, it is typically further processed. This further processing necessarily needs to be high speed in nature.

The first processing step that is typically required by protocols, filtering operations, and document type handlers is to organize sequences of symbols into meaningful, application specific classifications. Different applications use different terminology to describe this process. Text oriented applications typically call this type of processing lexical analysis. Other applications that handle non-text or mixed data types call the process pattern matching.

Performing lexical analysis or pattern matching is generally a computationally expensive step. This is because every symbol of information needs to be examined and dispositioned.

Regular expressions are well known in the prior art and are used for pattern matching and lexical analysis. Regular expressions provides a concise and flexible means for "matching" strings of text, such as particular characters, words, or patterns of characters. Abbreviations for "regular expression" include "regex" and "regexp" and these abbreviations may be used throughout this specification interchangeably with each other and with the term "regular expression". A regular expression is written in a formal language that can be interpreted by a regular expression processor, which can be a program that examines text or other characters in and identifies parts that match the provided rules of the regular expression. A regular expression in its simplest expression is a pattern. It is an expression that specifies a set of strings Examples of specifications that could be expressed in a regular expression are as follows:
  the sequence of characters "car" appearing consecutively in any context, such as in "car", "cartoon", or "bicarbonate"
  the sequence of characters "car" occurring in that order with other characters between them, such as in "Icelander" or "chandler"
  the word "car" when it appears as an isolated word
  the word "car when preceded by the word "blue" or "red"
  the word "car" when not preceded by the word "motor"
  a dollar sign immediately followed by one or more digits, and then optionally a period and exactly two more digits (for example, "$100" or "$245.98").

These sequences are simple and are intended only for purposes of example. Specifications of great complexity are conveyable by regular expressions.

Regular expressions are used by many text editors, utilities, and programming languages to search and manipulate text based on patterns. Some of these languages, including Perl, Ruby, AWK, and Tcl and may integrate regular expressions into the syntax of the core language itself. Other programming languages like .NET languages, Java, and Python provide regular expressions through standard libraries.

In some applications, it is desirable to find all matches to all rules within the input stream of data. This manner of matching can be referred to as "comprehensive" matching. In other applications, it is required that only the "longest-leftmost", for example, matches are reported. Overlapping matches are not permitted. This latter type of matching is commonly used for language or protocol parsing. This kind of matching is also commonly referred to as "greedy" matching.

To match regular expressions or similar pattern matching rules, two main types of state machines may be constructed, nondeterministic finite automata (NFA) and deterministic finite automata (DFA). NFAs are known to support hardware parallelism, but DFAs are traditionally executed sequentially. A single DFA is commonly constructed to find matches for many rules at once. A single execution of the DFA may be sufficient to find any match to any rule. Of course, it is also possible to construct and execute multiple DFAs for multiple rules, but the ability to find matches using a single DFA is an advantage of DFAs compared to NFAs.

A traditional DFA is built to find matches to the rules which start at only a single point in the input stream. The DFA has a root state, and a first symbol or character is consumed to make a transition from the root state to some next state. Further symbols are consumed to transition deeper until a match is found, or the absence of a valid transition indicates there is not match. After finding matches, if any, starting at the first symbol by this DFA descent, additional DFA descents from the root state are needed to find matches starting at later points in the input stream.

For comprehensive matching, in order to find all matches in the input stream, regardless of overlap, a separate DFA descent is needed beginning with each symbol of the stream. After a descent, whether it matches or not, the next DFA descent begins from the symbol immediately after the one used for beginning the previous descent.

Greedy matching can be implemented by beginning the next DFA descent from the symbol after the end of the last match. If a DFA descent ends without a match then the next DFA descent begins from the symbol immediately after the one used for beginning the previous descent.

When a sequence of symbols has been consumed that matches one of the rules from which the DFA was constructed, an "accepting "state" is reached. An "accepting state" indicates a match by the string of symbols consumed thus far. This "accepting state" could be a "terminal accepting state" if there are no output arcs. However, if there are other overlapping longer matches possible then the state will have output arcs to continue matching. Such an accepting state is called a "non-terminal accepting state".

At a non-terminal accepting state, depending on whether greedy or comprehensive matching is being performed, transitions and/or next state information will differ. For comprehensive matching, if all match conditions are met, the match has to be accepted and a token generated. There is no determination whether other comprehensive matches might overlap. For greedy matching, the match token cannot be output because there is a possibility that a longer match might occur. There is also the possibility that a longer match may not occur. Accordingly, the first greedy match is recorded as "greedy last accept" information. For each instance that an accepting state is reached from the same starting position, the "greedy last accept" information will be updated. Upon termination of the DFA descent, a match is reported from the recorded last accepting state information. Since successive updates to last accept information correspond to progressively longer matches, this report from last accept information will correspond to the longest match found, as required for greedy (longest-leftmost) matching. Naturally, if there were no recorded greedy matches during the DFA descent, no report will be made.

Also, it is possible that multiple defined regular expressions match the same section of an input stream. In such a case, all comprehensive matches will be reported. In greedy matching, priority is often attributed to one of the rules that were matched. For example, it could be the first expression as listed in the rule file that is given priority.

Existing solutions for matching a complete ruleset match either in a comprehensive mode or in a greedy mode. Sometimes the granularity of which mode to use is at the ruleset level. However, existing solutions perform either comprehensive or greedy matching at a time. As such, multiple passes through a rules engine are required for situations requiring both comprehensive and greedy matching results.

In an embodiment of the invention, a method for matching comprehensive and greedy expressions is disclosed. For purposes of this disclosure, this mixed mode matching is referred to as Blended Match Mode (BMM). Separate flags are used for greedy or comprehensive rules in a ruleset for each expression. A single scan is used to produce results for greedy rules and for comprehensive rules. During this single scan, comprehensive matches may be reported immediately and greedy matches may provide updates to "greedy last accept" information.

As noted above, a DFA is represented as a set of instructions, or commands, that are executed by hardware or software to find matches. The instructions depict state transitions, state information, match results and associated tokens—as well as possibly more information. The instructions associated with a particular state are collectively referred to as a "state block" or a "state instruction block". In an embodiment of the invention, the state transitions instructions contain information of the next "state block" embedded within them.

Further, a rule is associated with a token identifier (token ID). Some token IDs may have some action associated with it, for example terminating the match process, emitting the token ID, etc. A match may also have the information about the start position (SP) and end position (EP) in the input stream where the match was found. All such information—token ID, start and end positions, actions, etc.—is referred to here as "match information' or simply "match". The process of emitting some or all match information and performing the associated action is referred to here as "reporting a match".

In an embodiment of the invention, accepting states of the DFA are annotated with match information for all greedy and comprehensive rules that complete a match. These matches may be in terminal accepting states or non-terminal accepting states. A single DFA state could be an accepting state, terminal or non-terminal, for multiple greedy and multiple comprehensive matches.

When the execution of instructions reaches an accepting state, the scanner accesses the annotation information regarding comprehensive and greedy matches. If the state is an accepting state for a comprehensive match, and conditions for a match are satisfied, the event may be recorded as "comprehensive match information". An embodiment of the invention may report all the comprehensive matches associated with an accepting state immediately rather than collecting all such matches for reporting later, leading to arbitrary storage requirements. If the state is an accepting state for a greedy rule, and conditions for the match are satisfied, the event may be recorded as "greedy last accept" information. The "greedy last accept" record may be in the form of the state itself, a reference to the state, a list of tokens or a reference to a list of tokens or some other type of form. In the case that the greedy match is a non-terminal accepting state, the DFA descent will continue further and the "greedy last accept" information will be updated, i.e. overwritten, every time an accepting state for a greedy rule is reached. When the DFA descent is complete, or when it is known that there are no longer greedy match possibilities for further DFA descent, the "greedy last accept" information is utilized to report a match.

When a state is an accepting state for both greedy and comprehensive rules, then both the actions, recording "greedy last accept" information and reporting comprehensive rule matches, are performed.

Whether a particular state is an accepting state for one or more comprehensive rules and/or an accepting state for one or more greedy rules may be indicated as two separate flags, referred herein as "Save Accept Comprehensive" (SAC) flag and "Save Accept Greedy" (SAG) flag. This allows the scanner to update "greedy last accept" information and to determine the need for comprehensive match reporting without accessing actual match information immediately.

The annotation information of a state block (instructions associated with a state) or part of the information, e.g. the SAC and SAG flags, may be embedded into every state transition instruction. This may result in minimizing additional information fetches from the state block.

FIG. 1 shows a state machine (DFA) for Blended Match Mode. The state machine 100 shows descents from a root state 110 (S0). A first descent 120 proceeds from the root state 110 to S1 to S2. A second descent 130 proceeds from the root state 110 to S3 to S4 to S5 to S6. The third descent 140 proceeds from the root state 110 to S7 to S8.

As an example in relation to the state machine 100 of FIG. 1, an input stream of "abcde" is used. Rules for this example are as follows: A comprehensive match for 'ab' corresponds to token T0; A comprehensive match for 'bc' corresponds to token T1; a greedy match for 'be' corresponds to token T2; A greedy match for 'bcde' corresponds to token T3; A comprehensive match for 'cd' corresponds to token T4; and a greedy match for 'cd corresponds to token T5. These token output rules 150 are provided in FIG. 1 for ease in reference.

For the example input stream of "abcde", the multiple possible descents are as follows: the first descent 120, the second descent 130 and the third descent 140. Again, for purposes of the example, the position of 'a' is SP=0.

The first descent 120 in FIG. 1 starts with the first character of the input stream at position 0—'a'. As symbols are consumed in the input stream, the DFA will descend down the first descent 120. Consumption of 'a' at SP=0 causes a transition to S1. Consumption of the next symbol, 'b', causes a transition to S2. As shown in FIG. 1, state S2 is a terminal accepting state. A set SAC flag is annotated in the descent at S2. The 'ab' symbol stream, to this point, corresponds to a comprehensive rule match and a T0 match is reported.

Continuing with FIG. 1, after completion of the first descent 120, the second descent 130 will initiate with consumption of the 'b' at position SP=1 in the input stream and the DFA will transition to S3. Next, consumption of 'c' causes a transition to S4. S4 is an accepting state. Set SAC and SAG flags are annotated in the descent at S4. The 'bc' symbol stream corresponds to a comprehensive rule match and a T1 match is reported. The 'bc' symbol stream also corresponds to a greedy rule match. However, since this is a greedy rule match, the corresponding T2 match will cause the "greedy last accept" information to be updated. The descent will continue with consumption of 'd' and transition to S5. The next symbol 'e' is consumed and the DFA transitions to S6. S6 is a terminal accepting state for the greedy match and the SAG flag will again be annotated. The corresponding T3 match is reported.

As noted above, all matches generated from the second descent 130 will have SP=1. The states traversed are S0→S3→S4→S5→S6. Upon reaching state S4, the token T1 for a comprehensive match was immediately generated. However, since State S4 is a non-terminal-accepting state so the greedy token is not immediately generated. The "greedy last accept" information is updated. The "greedy last accept" information may be in the form of a reference to state S4 (so that it can be referred to later in order to retrieve T2 match information) or in the form of actual match information, i.e. greedy-last-accept-ID=T2 and greedy-last-accept-EP=2. Any other information associated with T2 may also be recorded. The DFA descent continued to state S6. Since S6 had SAG set, the earlier "greedy last accept" information is replaced with T3 match information. Since the DFA descent ends at state S6, the "greedy last accept" information is used to generate the greedy match T3: ID=T3; SP=1, EP=4.

A third descent 140 starts with the character at the last start point+1. Accordingly, the third descent 140 starts with the character 'c' as the first character in the descent and SP=2. Just as the match from the first descent 120 had SP=0 associated with it and the matches from the second descent 130 and SP=1 associated with it, all matches generated from this third descent 140 will have SP=2 value. Consumption of the 'c' at SP=2 causes a transition to S7. The next symbol, 'd', causes a transition to S8. S8 is a terminal accepting state. An SAC and SAG flag are annotating S8. This provides a contrast to accepting states S2 and S4 in the first 120 and second descents 130 respectively. These descents were either a terminal accepting state (S2) or a non-terminal accepting state with both SAC and SAG flags set. The T4 comprehensive match will be immediately reported. Also, the T5 greedy match will update the "greedy last accept" information and since the DFA descent ends at S8, the "greedy last accept" information is used to generate the greedy match T5: ID=T5, SP=2, EP=3.

For an input stream of "bcdx", the states traversed are S0→S3→S4→S5. At state S4, a comprehensive match token T1 output, and token T2 information is used to update the "greedy last accept". At state S5, when 'x' is consumed, the match fails and the DFA descent ends. Since there is a valid "greedy last accept" record based on the update, the token T2 is generated, ID=T2; SP=0, EP=1.

In all three above described descents, first 120, second 130 and third 140, there are accepting states, S2, S4, S6 and S8. It is so described that SAC and/or SAG flags are annotating the accepting states. It is understood that the SAC and SAG flags may be part of the transition instructions to the accepting destination states. As such, annotations for accepting state S4 for both the SAC and SAG flags may be part of the instruction accessed at the S3 state instruction block and executed when the 'd' symbol is consumed. Following is a description of an embodiment of instruction execution in relation to the state transitions described.

Each transition to a destination state requires the execution of instructions and the consumption of at least one symbol in the input stream. The instructions may be located in a state instruction block for each state of the DFA. The consumption of symbols and transition to destination states is discussed above in regard to the descents 120, 130, 140 of FIG. 1. As an example of the inter-relation of instruction execution and symbol consumption and state transition, consider the second descent 130 in FIG. 1.

In an embodiment of the invention, the root state S0 is initially active. It is understood that a root state will be initially active so that a first symbol consumption and instruction access is possible. While the DFA is in state S0, the first symbol of the descent, 'b' in this case, is consumed at SP=1. The consumption of the symbol 'b' allows the S0 state to access an S0 instruction. The instruction accessed indicates a transition to a next state, S3 in this case. Now, for purposes of explanation, it can be thought of that the DFA is essentially in the S3 at this point. Next, the instruction accessed at S0 will execute and the next symbol in the stream is consumed, 'c'. This consumption of the 'c' will allow access of an S3 instruction. The instruction accessed at S3 will indicate a transition to S4. The DFA is essentially in S4 at this point. The instruction accessed at S3 will execute and the next symbol will be consumed, 'd'. However, note that S3 transitioned into an accepting state (S4) in FIG. 1. Although S4 is indicated as the accepting state, as noted above, in an embodiment of the invention, the S3 instruction has an SAC and SAG flag annotated in its instruction. The SAC flag will cause an output of T1 match information, possibly including a token ID which may be present in the S3 instruction, or obtained from a separate token instruction accessed from S4. The SAG flag will cause an update of the "greedy lasts accept" information.

The previous consumption of 'd' will allow access to an S4 instruction. The instruction accessed will indicate a transition to S5. The DFA is effectively in state S5. The instruction accessed at S4 will execute and the next symbol, 'e', is consumed. The 'e' will allow access to an S5 instruction. The S5 instruction has an SAG flag set similar to the flags set above in regard to S3. The "greedy last accept" information will be updated. Since there are no further symbols in the input stream, there is no further consumption. The S5 instruction will execute. The descent will terminate and the T3 match is output. The S0 state will again be active and will begin new descents, for example the third descent 140, starting at successive positions in the input stream.

As noted in the above discussion of instruction execution, having accessed an instruction at a certain state means that the DFA is effectively in the next state. Also, it is understood that a terminal state such as S6 may not have a state block associated with it in an embodiment of the invention. In such a case, the S5 instruction will immediately output any associated token information. This is similar for an instruction indicating a transition to any accepting state, such as S2, S4, or S8, which will either output token information or update "greedy last accept" information, or both. However, it is understood that a state such as S8 may have an instruction block since there are multiple tokens associated with this terminal accepting state. The S8 instruction block will contain instructions for output of relevant information and terminate the descent. Further, it is understood that other accepting states, such as S4, may have a token read from an associated state instruction block. Accordingly, it is understood that accepting states may or may not have associated instruction blocks depending on the efficiency and operation of the DFA.

Figure 2:
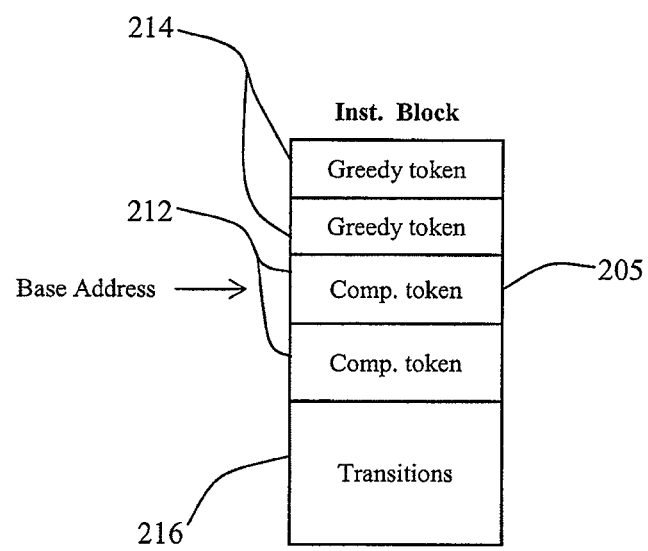
FIG. 2 is a diagram of an instruction block format.

FIG. 2 is a diagram of an instruction block format. In an embodiment of the invention, there is an Instruction Block 210. An instruction block will have a state base address (SBA) 205. A transition will point to the state base address 205 of the instruction block. The instruction block may also have at least one comprehensive token 212 (a plurality is shown in FIG. 2), at least one greedy token 214 (a plurality is shown in FIG. 2), and at least one transition instruction 216 (a plurality of transitions may be present in the block depending on the complexity of the DFA). It is understood the instruction block may also comprise zero (0) or a plurality of comprehensive tokens, zero (0) or a plurality of greedy tokens and/or zero (0) or a plurality of transition instructions.

Comprehensive tokens 212 begin at the state base address 205. Accordingly, the first comprehensive token is at SBA+0. If a chain flag in the first comprehensive token instruction is high, there is another comprehensive token at SBA+1, and so forth. When a non-terminal instruction has SAC=1, the scanner will execute a comprehensive stall and read the token at SBA. When SAC=1, the chain of comprehensive tokens 212 is output immediately before considering transitions. The scanner will then increment SBA sequentially until the chain flag=0. At which point, the pointer will point to the first transition instruction in the block. The transition instruction will enable transition to a destination state. When there are multiple transition instructions 216, execution of the previous instruction along with consumption of an input symbol may determine which transition instruction to access.

Greedy tokens begin at SBA-1. If the chain flag is set, that means there is another greedy token at SBA-2 and so forth, similar to that for comprehensive tokens. When a non-terminal instruction has SAG=1, the scanner will save the greedy information in the "greedy last accept", or in case of match failure, it may output the chain of greedy tokens immediately.

A transition instruction will have a destination offset pointer that will point to the next state base address, and other information for selecting the next transition instruction at an offset from the next state base address determined by the next input symbol. In an embodiment of the invention, all pointers are relative to the current instruction. A token instruction will provide Token ID, Match Type (MT), Use Start Condition (USC), Start Condition (SC), chain flag (CH) and other information for outputting match information or indicating other actions on a match. A match type will indicate if you have a greedy or a comprehensive match. A "Start Condition" and "Use Start Condition" are for changing the start condition (rule group) for future DFA descents. This may be a start condition jump, or a push/pop on a stack. A chain flag makes you look at the next token position until CH=0. It is understood that there is much more information in an instruction and the above is for purposes of elucidating the types of information that can be in an instruction. For instance, there can be 1C, 2C, 3C and 4C instruction format information which encode character classes rather than individual symbols. Also, there can be 1C-Tok and 0C-tok formats that have immediate tokens.

Figure 3:
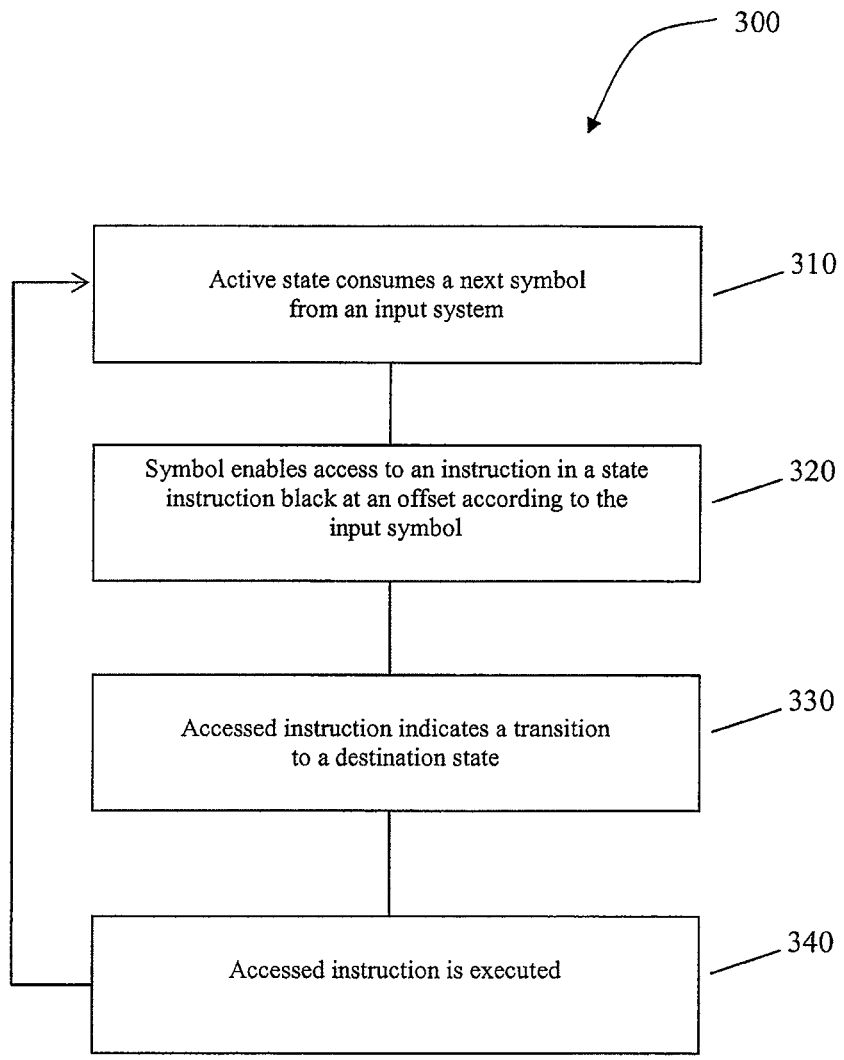
FIG. 3 is a flow diagram for execution of a BMM DFA.

FIG. 3 is a flow diagram for execution of a BMM DFA. A method of BMM 300 is shown as discussed in this invention description. It is understood that not all steps in a BMM method are necessarily shown in FIG. 3. It is the purpose of this figure to illustrate and elaborate on the concepts of transition and execution discussed above in regard to FIGS. 1 and 2. Initially, an active state consumes an input symbol from an input stream 310. The consumed symbol enables access to an instruction in the state instruction block 320. The accessed instruction indicates a transition to a destination state 330. The accessed instruction is executed 340 and a next symbol is consumed 310.

In BMM of an embodiment of the current invention, DFA descents from each position in the stream are performed. This is so irrespective of greedy match events since the DFA may contain comprehensive match possibilities also. This may result in overlapping greedy matches being found. Excess greedy match tokens are selectively filtered to prevent reporting of overlapping matches. The start point of a match in the input stream is called the start position (SP) and the end point of a match is called the end position (EP). The filtering process involves iteratively inspecting match tokens in the increasing order of their SP. For example, SP1 and EP1 are the start and end positions of a greedy match that was last committed and not dropped by the filter. EP 1 is recorded in some storage location, such as a register, and is referred to as the "greedy scan cursor" because it indicates the position after which another greedy match is allowed. A subsequent greedy match that has its SP less than or equal to EP1 will be dropped. This achieves a non-overlapping behavior of greedy matching requirements. Two greedy tokens with the same SP will not be present because only the longest match will be generated by each DFA descent. As noted before, greedy matches do not affect comprehensive matches and comprehensive matches do not affect greedy matches as far as filtering is concerned.

Starting from various positions in the input stream, if the execution of a DFA descent is such that tokens are generated in the order of increasing SP, in an embodiment of the invention, it may be an operating principle that overlapping greedy tokens not be initially generated (output) in the first place so that filtering is not required. Such ordered tokens may get typically generated in sequential implementation of DFA engines either in hardware or software. In an embodiment, the compiler annotates sections of DFA branches leading to only greedy matches. While in these sections of the DFA, the sequential scanner can abandon DFA descents that lead to overlapping greedy matches and thereby improve performance. The DFA descent would be abandoned leading only to greedy matches which started in a position overlapping an already committed greedy match.

In an embodiment of the invention, DFA descents that start in various positions in the input stream may run in parallel and may start or complete out of order depending on match lengths, execution scheduling policies or other factors. By this, it is meant that a descent that starts at SP+10 may complete prior to a parallel descent that begins at SP+0. The reason for this is that descent starting at SP+0 may continue longer and thereby finish later. Accordingly, they will finish out of order relative to their start order.

In such a case, the tokens generated may need to be sorted by increasing order of their Start Position. It is understood that there may be other methods of sorting depending of different policies. In the example of FIG. 1, token sorting would be as follows:

ID=T0; SP=0, EP=1; comprehensive
ID=T1; SP=1, EP=2; comprehensive
ID=T3; SP=1, EP=4; greedy
ID=T4; SP=2, EP=3; comprehensive
ID=T5; SP=2, EP=3; greedy A token filter would not affect the comprehensive tokens. The comprehensive tokens are accepted and allowed to pass through the filter. For greedy tokens, the token filter compares the SP of every greedy token with the EP of the last committed (not dropped) greedy token to find an overlap. Upon receiving greedy token T3, since it does not overlap with a previous greedy match, it is committed. The EP of T3 (EP=4) is remembered by the filter as EP', for example. Upon receiving greedy token T5, its SP is compared with EP'. Since SP of T5 is less than EP', token T5 is dropped.

In an embodiment of the invention, the input stream may be presented to the execution engine in a fragmented form of packets arriving at arbitrary instances of time. Match context needs to be carried from one packet to the next. The context may be in the form of a section of previous packet data or the state of the engine or a combination of the two. Also, it is possible that there are greedy matches that span packet boundaries. Last committed greedy match information needs to be part of the cross packet context so that greedy matches that started in the previous packet can be correctly filtered in the next packet.

In an embodiment of the invention, a DFA representation is chosen supporting the annotation of match information as described above. A DFA compiler is programmed to annotate the greedy and comprehensive match information into the DFA representation. A DFA scanner, which scans streams of input symbols for matches using a DFA is implemented to be capable of decoding, checking and utilizing the annotated information. A DFA scanner may be implemented in hardware or software. Further, a stream of input symbols must be communicated into the scanner. Reported matches must be reported out of the scanner. These tasks are understood by someone skilled in the art.

Using BMM, each expression can separately be flagged as greedy or comprehensive in the ruleset, by some rule syntax such as including "<[greedy]>" or "<[comprehensive]>" before, inside, or after each rule. Matches corresponding to comprehensive and greedy rules are indicated within the DFA as has been discussed above, SAC=1 and SAG=1. In an embodiment of the invention, BMM is a scanner feature whereby greedy and comprehensive modes are combined and controlled by the instructions.

Non-terminal accepting states may accept for greedy or comprehensive expressions, or both. On a comprehensive accept (SAC=1, the scanner executes a comprehensive stall to output one or more tokens immediately. On a greedy accept (SAG=1), the scanner updates "greedy last accept" information. A stall is where the token output is read before commencing with the next transition.

Terminal instructions also support matches for greedy or comprehensive expressions, or both. Greedy matches update the greedy scan cursor, but comprehensive matches do not. Full-length greedy matches (greedy matches indicated in a terminal instruction) preempt the "greedy last accept" information, but comprehensive matches do not. If a terminal instruction does not indicate a greedy match, but greedy last accept information was saved earlier in the DFA descent, a greedy stall is executed. A greedy stall is the action of following the "greedy last accept" that was saved to output a greedy token. Accordingly, it is possible for a terminal state to output comprehensive tokens, and also execute a greedy stall to output a shorter "greedy last accept" greedy match.

In an embodiment of the invention, both greedy and comprehensive rules are permitted to change start conditions. All start condition changing matches are such that scanning resumes at EP+1 in the new start condition. No further matches with SP beyond the start condition change are accepted in the old start condition. The difference between a greedy and comprehensive start condition change is that a comprehensive start condition change takes effect immediately upon matching at its EP while a greedy start condition change must wait for the longest greedy match resolution.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method for matching rules to an input stream by executing a single DFA having a plurality of states, wherein said rules require greedy matching and comprehensive matching, comprising:

in a scanner:
executing the DFA in a single scan descent;
reporting comprehensive match tokens;
reporting greedy match tokens; and if it is known that a given start position in the input stream cannot be the beginning of a comprehensive match, and the start position overlaps a committed greedy match, skipping to the next viable position in the input stream.

2. The method of claim 1, wherein the step of reporting greedy matches comprises:

recording non-terminal matches as greedy-last accept information;

updating the greedy-last accept information as the descent continues; and reporting the last updated greedy-last accept information when the descent ends.

3. The method of claim 1, said method further comprising selectively filtering greedy matches by iteratively inspecting match tokens in the increasing order of the start position.

4. The method of claim 1, wherein the step of reporting greedy matches comprises:

recording non-terminal matches as greedy-last accept information;

updating the greedy-last accept information as the descent continues;

reporting the last updated greedy-last accept information when the descent ends; and wherein said method further comprises selectively filtering greedy matches by iteratively inspecting match tokens in the increasing order of the start position.

5. The method of claim 1, wherein the steps of reporting comprehensive match tokens and reporting greedy match tokens do not affect each other.

6. The method of claim 1, said method further comprising: sorting any reported tokens.

7. The method of claim 1, said method further comprising: annotating sections of branches in the DFA that lead only to greedy matches, wherein a scanner is enabled to abandon DFA descents that overlap committed greedy matches.

8. The method of claim 1, wherein each of said plurality of states is associated with a state instruction block:

wherein an accepting state instruction block contains at least one comprehensive match token and at least one greedy match token; and the at least one comprehensive match token is at a nonnegative offset from the base address in the state instruction block and the at least one greedy match token is at a negative offset from the base address in the state instruction.

\* \* \* \* \*